(12) United States Patent
Williams

(10) Patent No.: US 8,010,364 B2
(45) Date of Patent: Aug. 30, 2011

(54) SYSTEM AND METHOD FOR APPLYING PROBABILITY DISTRIBUTION MODELS TO DIALOG SYSTEMS IN THE TROUBLESHOOTING DOMAIN

(75) Inventor: Jason Williams, New York, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 971 days.

(21) Appl. No.: 11/930,366

(22) Filed: Oct. 31, 2007

(65) Prior Publication Data

US 2009/0112598 A1    Apr. 30, 2009

(51) Int. Cl.
*G10L 21/00* (2006.01)
(52) U.S. Cl. ............... 704/270; 704/270.1; 704/272; 704/275; 704/231

(58) Field of Classification Search .......... 704/270, 704/270.1, 272, 275, 276, 231
See application file for complete search history.

(56) References Cited

U.S. PATENT DOCUMENTS

| | | | |
|---|---|---|---|
| 6,336,108 B1* | 1/2002 | Thiesson et al. | 706/20 |
| 2007/0213984 A1* | 9/2007 | Ativanichayaphong et al. | 704/257 |
| 2008/0181099 A1* | 7/2008 | Torab et al. | 370/216 |

* cited by examiner

*Primary Examiner* — Qi Han

(57) ABSTRACT

Disclosed herein are systems, methods, and computer-readable media for troubleshooting based on a probability distribution model. The method for troubleshooting based on a probability distribution model includes establishing a speech-based channel of interaction, establishing at least one non-speech-based channel of interaction, maintaining a probability distribution over time for each of a plurality of component variables describing the state of the product or service and state of the conversation, and troubleshooting a product or service by responding based on the probability distribution.

21 Claims, 17 Drawing Sheets

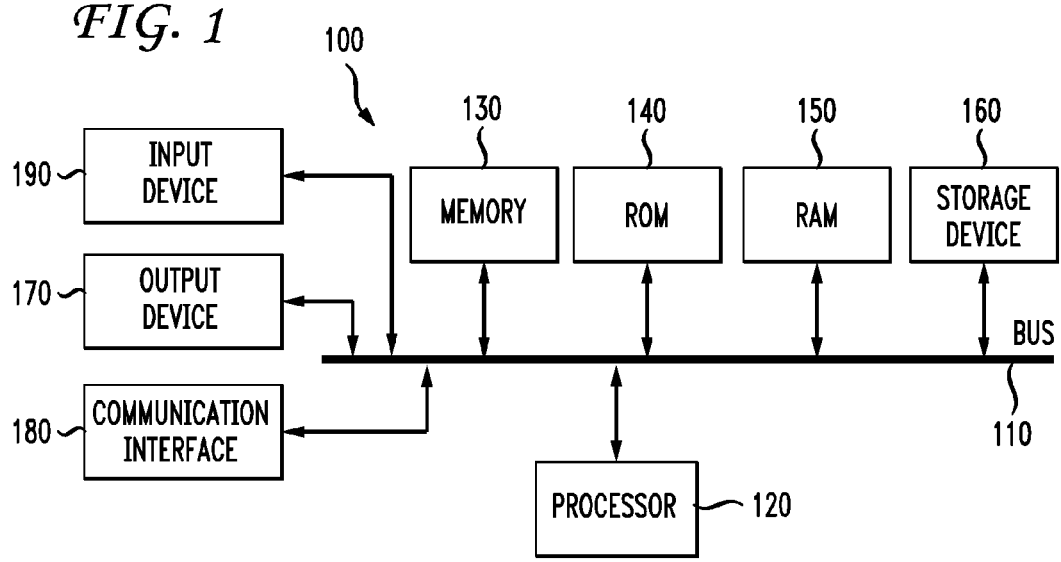
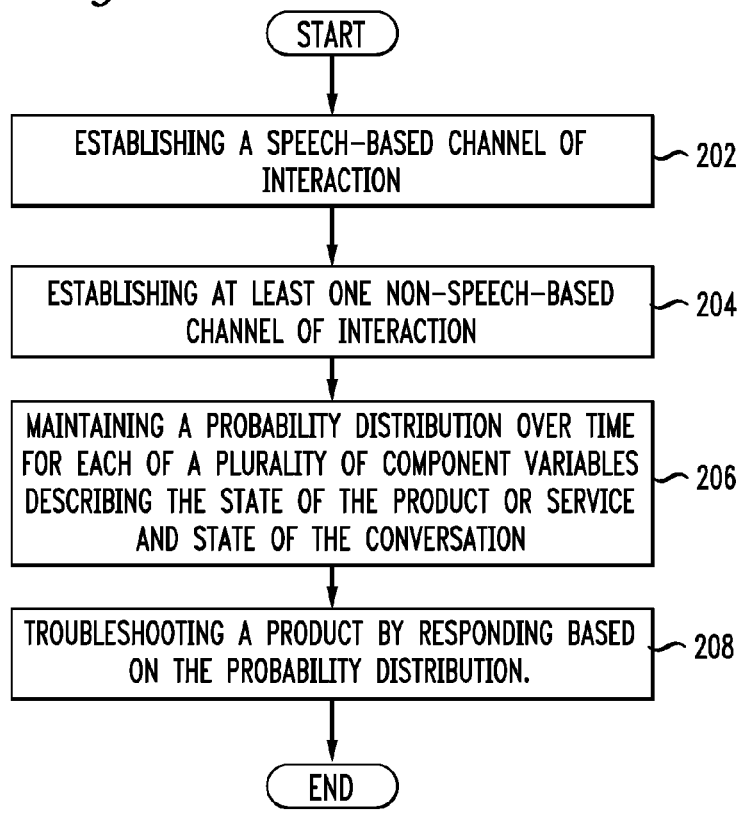

FIG. 5D

| | | |
|---|---|---|
| SERVICE OUTAGE | | TRUE |
| PORT RESET NEEDED | | TRUE |
| BIG PROBLEM | | TRUE |
| STATE OF MODEM | | ON |
| PASSWORD ON MODEM | | TRUE |
| PASSWORD IN BROWSER | | TRUE |
| SERVICE TYPE ON MODEM | | TRUE |
| SERVICE TYPE IN BROWSER | | TRUE |
| USERNAME ON MODEM | | TRUE |
| USERNAME IN BROWSER | | TRUE |
| OVERALL MODEM CONFIG | FALSE | TRUE |
| OVERALL CONNECTION STATE | FALSE | TRUE |
| USER CAN OPEN A WEBPAGE | FALSE | |

| | | |
|---|---|---|
| CONFIG SCREEN VISIBLE | FALSE | |
| NETWORK LIGHT | RED | |
| POWER LIGHT | | GREEN |

ASR/NLU result no

TS test result null confScore (24)

ASR result "no" is unlikely;
combined with low conf score,
this yield little change in belief

FIG. 5E

| | | |
|---|---|---|
| SERVICE OUTAGE | | TRUE |
| PORT RESET NEEDED | FALSE | TRUE |
| BIG PROBLEM | | TRUE |
| STATE OF MODEM | | ON |
| PASSWORD ON MODEM | FALSE | TRUE |
| PASSWORD IN BROWSER | | TRUE |
| SERVICE TYPE ON MODEM | | TRUE |
| SERVICE TYPE IN BROWSER | | TRUE |
| USERNAME ON MODEM | FALSE | TRUE |
| USERNAME IN BROWSER | | TRUE |
| OVERALL MODEM CONFIG | FALSE | TRUE |
| OVERALL CONNECTION STATE | FALSE | TRUE |
| USER CAN OPEN A WEBPAGE | FALSE | |
| CONFIG SCREEN VISIBLE | FALSE | |
| NETWORK LIGHT | RED | |
| POWER LIGHT | | GREEN |

ASR/NLU result red

TS test result null confScore (71)

Plausible answer ("red") with a higher confidence score, belief in all problems increases

FIG. 5F

| | | |
|---|---|---|
| SERVICE OUTAGE | | TRUE |
| PORT RESET NEEDED | FALSE | TRUE |
| BIG PROBLEM | | TRUE |
| STATE OF MODEM | | ON |
| PASSWORD ON MODEM | FALSE | TRUE |
| PASSWORD IN BROWSER | | TRUE |
| SERVICE TYPE ON MODEM | | TRUE |
| SERVICE TYPE IN BROWSER | | TRUE |
| USERNAME ON MODEM | FALSE | TRUE |
| USERNAME IN BROWSER | | TRUE |
| OVERALL MODEM CONFIG | FALSE | TRUE |
| OVERALL CONNECTION STATE | FALSE | TRUE |
| USER CAN OPEN A WEBPAGE | FALSE | |
| CONFIG SCREEN VISIBLE | FALSE | |
| NETWORK LIGHT | RED | |
| POWER LIGHT | | GREEN |

ASR/NLU result null

TS test result null confScore (100)

Belief that there is a service outage

FIG. 5G

| | | |
|---|---|---|
| SERVICE OUTAGE | | TRUE |
| PORT RESET NEEDED | | TRUE |
| BIG PROBLEM | | TRUE |
| STATE OF MODEM | | ON |
| PASSWORD ON MODEM | FALSE | TRUE |
| PASSWORD IN BROWSER | | TRUE |
| SERVICE TYPE ON MODEM | | TRUE |
| SERVICE TYPE IN BROWSER | | TRUE |
| USERNAME ON MODEM | FALSE | TRUE |
| USERNAME IN BROWSER | | TRUE |
| OVERALL MODEM CONFIG | FALSE | TRUE |
| OVERALL CONNECTION STATE | FALSE | TRUE |
| USER CAN OPEN A WEBPAGE | FALSE | |

| | | |
|---|---|---|
| CONFIG SCREEN VISIBLE | FALSE | |
| NETWORK LIGHT | RED | GREEN |
| POWER LIGHT | | GREEN |

ASR/NLU result null

TS test result null confScore (100)

> Belief that a port needs to be reset

*FIG. 5H*

| | |
|---:|:---|
| SERVICE OUTAGE | TRUE |
| PORT RESET NEEDED | TRUE |
| BIG PROBLEM | TRUE |
| STATE OF MODEM | ON |
| PASSWORD ON MODEM | FALSE / TRUE |
| PASSWORD IN BROWSER | TRUE |
| SERVICE TYPE ON MODEM | FALSE / TRUE |
| SERVICE TYPE IN BROWSER | TRUE |
| USERNAME ON MODEM | FALSE / TRUE |
| USERNAME IN BROWSER | TRUE |
| OVERALL MODEM CONFIG | FALSE |
| OVERALL CONNECTION STATE | FALSE |
| USER CAN OPEN A WEBPAGE | FALSE |

| | |
|---:|:---|
| CONFIG SCREEN VISIBLE | FALSE |
| NETWORK LIGHT | RED |
| POWER LIGHT | GREEN |

ASR/NLU result red

TS test result null confScore (72)

> Belief in almost all problems goes up, but not in problems which have been excluded

FIG. 5I

| | |
|---|---|
| SERVICE OUTAGE | TRUE |
| PORT RESET NEEDED | TRUE |
| BIG PROBLEM | TRUE |
| STATE OF MODEM | ON |
| PASSWORD ON MODEM | FALSE / TRUE |
| PASSWORD IN BROWSER | FALSE / TRUE |
| SERVICE TYPE ON MODEM | FALSE / TRUE |
| SERVICE TYPE IN BROWSER | FALSE / TRUE |
| USERNAME ON MODEM | FALSE / TRUE |
| USERNAME IN BROWSER | FALSE / TRUE |
| OVERALL MODEM CONFIG | FALSE |
| OVERALL CONNECTION STATE | FALSE |
| USER CAN OPEN A WEBPAGE | FALSE |

| | |
|---|---|
| CONFIG SCREEN VISIBLE | TRUE |
| NETWORK LIGHT | RED |
| POWER LIGHT | GREEN |

ASR/NLU result ack

TS test result null confScore (59)

Belief that the DSL configuration screen is visible

FIG. 5K

| | |
|---|---|
| SERVICE OUTAGE | TRUE |
| PORT RESET NEEDED | TRUE |
| BIG PROBLEM | TRUE |
| STATE OF MODEM | ON |
| PASSWORD ON MODEM | FALSE / TRUE |
| PASSWORD IN BROWSER | TRUE |
| SERVICE TYPE ON MODEM | FALSE / TRUE |
| SERVICE TYPE IN BROWSER | FALSE / TRUE |
| USERNAME ON MODEM | FALSE / TRUE |
| USERNAME IN BROWSER | TRUE |
| OVERALL MODEM CONFIG | FALSE |
| OVERALL CONNECTION STATE | FALSE |
| USER CAN OPEN A WEBPAGE | FALSE |

| | |
|---|---|
| CONFIG SCREEN VISIBLE | TRUE |
| NETWORK LIGHT | RED |
| POWER LIGHT | GREEN |

ASR/NLU result yes

TS test result null confScore (74)

Belief that password has been entered correctly in browser

FIG. 5L

| | |
|---|---|
| SERVICE OUTAGE | TRUE |
| PORT RESET NEEDED | TRUE |
| BIG PROBLEM | TRUE |
| STATE OF MODEM | ON |
| PASSWORD ON MODEM | FALSE / TRUE |
| PASSWORD IN BROWSER | TRUE |
| SERVICE TYPE ON MODEM | FALSE / TRUE |
| SERVICE TYPE IN BROWSER | TRUE |
| USERNAME ON MODEM | FALSE / TRUE |
| USERNAME IN BROWSER | TRUE |
| OVERALL MODEM CONFIG | FALSE |
| OVERALL CONNECTION STATE | FALSE |
| USER CAN OPEN A WEBPAGE | FALSE |

| | |
|---|---|
| CONFIG SCREEN VISIBLE | TRUE |
| NETWORK LIGHT | RED |
| POWER LIGHT | GREEN |

ASR/NLU result yes

TS test result null confScore (71)

Belief that service type has been entered correctly in browser

FIG. 5M

| | |
|---|---|
| SERVICE OUTAGE | TRUE |
| PORT RESET NEEDED | TRUE |
| BIG PROBLEM | TRUE |
| STATE OF MODEM | ON |
| PASSWORD ON MODEM | TRUE |
| PASSWORD IN BROWSER | TRUE |
| SERVICE TYPE ON MODEM | TRUE |
| SERVICE TYPE IN BROWSER | TRUE |
| USERNAME ON MODEM | TRUE |
| USERNAME IN BROWSER | TRUE |
| OVERALL MODEM CONFIG | TRUE |
| OVERALL CONNECTION STATE | TRUE |
| USER CAN OPEN A WEBPAGE | FALSE |
| CONFIG SCREEN VISIBLE | FALSE / TRUE |
| NETWORK LIGHT | GREEN |
| POWER LIGHT | GREEN |

ASR/NLU result ack

TS test result null confScore (50)

Belief that configuration values have been stored to the modem

FIG. 5N

| | |
|---|---|
| SERVICE OUTAGE | TRUE |
| PORT RESET NEEDED | TRUE |
| BIG PROBLEM | TRUE |
| STATE OF MODEM | ON |
| PASSWORD ON MODEM | TRUE |
| PASSWORD IN BROWSER | TRUE |
| SERVICE TYPE ON MODEM | TRUE |
| SERVICE TYPE IN BROWSER | TRUE |
| USERNAME ON MODEM | TRUE |
| USERNAME IN BROWSER | TRUE |
| OVERALL MODEM CONFIG | TRUE |
| OVERALL CONNECTION STATE | TRUE |
| USER CAN OPEN A WEBPAGE | FALSE |

| | |
|---|---|
| CONFIG SCREEN VISIBLE | FALSE / TRUE |
| NETWORK LIGHT | GREEN |
| POWER LIGHT | GREEN |

ASR/NLU result null

TS test result pingok confScore (100)

Successful ping eliminates belief in any other problems

SYSTEM AND METHOD FOR APPLYING PROBABILITY DISTRIBUTION MODELS TO DIALOG SYSTEMS IN THE TROUBLESHOOTING DOMAIN

BACKGROUND OF THE INVENTION

1. Field of the Invention

The present invention relates generally to automated troubleshooting, and relates more specifically to applying probability distribution models to improve automated troubleshooting.

2. Introduction

The last quarter-century has been marked by an explosion of consumer electronics with vary levels of complexity. These consumer electronics occasionally fail to function as expected, leaving the consumer to either attempt to fix it himself using a printed or on-line manual, hire a professional to fix it, or call technical support. Included in these consumer electronics are in-home services such DSL routers, DSL connections, and IPTV receivers. Fortunately, these failures are becoming less frequent with improvements in manufacturing and technology. Unfortunately, as a result, consumers have little experience troubleshooting, and generally require assistance to restore their connection. Since devices like DSL modems or cable modems provide Internet connectivity, a failed modem precludes a user from obtaining on-line support. As a result, many consumers resort to calling the technical support department. Technical support calls are expensive and potentially inconsistent for service providers due to human costs, training, equipment, varying skill levels of the technicians, etc. Many Internet service providers therefore desire to provide as much support as possible using an automated interactive voice response (IVR) system.

One conventional solution to this problem is to employ a conventional simple IVR system to initially answer support calls. Simple IVRs ask for information required to route the call to the appropriate operator skill-set, for example, dial-up or DSL connections, or Windows, Mac, or Linux platforms. Simple IVRs may also ask callers to choose from a fixed list of options to self-classify their problem. Some simple IVRs play tips while a user is on hold waiting for a technician. The tips may help some fraction of callers to restore connectivity. These solutions may not adequately address the cost or consistency issues.

More advanced conventional IVRs attempt to engage in a conversation to actually fix the caller's connection. These systems ask questions such as "What color is the network light?" and give pre-prepared instructions based on user responses such as "Now, try switching the DSL router off." When the caller responds, automated speech recognition (ASR) is used to convert the caller's speech to text. ASR converts speech to text in varying degrees of reliability and is dependent on many external factors. Consequently, text converted by ASR will contain errors. The dialog manager can never know for sure what the user actually said. The IVR may also run a network test, for example to ping the caller's device or to determine if there are any outages reported in the caller's area. The results from the network tests may also be unreliable and may contain errors.

As the dialog progresses, conventional systems maintain a belief about the state of the product or service. Some belief states may include whether it is on or off, failed, working correctly, etc. The IVR cannot observe the product directly or accurately; all information about the product state is derived from the ASR and network test results. Since these inputs may contain errors, the IVR's belief about the product state may be incorrect.

The problem with conventional solutions is that even a single incorrect belief may lead to failed dialogs and low customer satisfaction. For example, if the system believes a DSL router is working when actually it is not, it may end the conversation prematurely. Conventional systems have a number of ad hoc techniques which attempt to reduce the chances of forming an incorrect belief, such as using thresholds on ASR confidence scores and confirmations like "I heard you say 'XYZ' is that right?" The problem with these approaches is that they lengthen dialogs, which leads to user frustration. The core problem is that conventional IVR systems can't cope with the ambiguity introduced by errors in the speech recognition and network test inputs. The root cause of this failure to cope is that conventional systems maintain a single guess for the state of the product or service, i.e. conventional systems employ Boolean logic for guessing the state of the product or service. Accordingly, what is needed in the art is a way to way to troubleshoot broken systems by maintaining multiple guess states over time for the state of the product or service.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The present invention relates generally to automated troubleshooting, and relates more specifically to applying probability distribution models to improve automated troubleshooting. Disclosed herein are systems, methods, and computer-readable media for troubleshooting based on a probability distribution model. The method for troubleshooting based on a probability distribution model includes establishing a speech-based channel of interaction, establishing at least one non-speech-based channel of interaction, maintaining a probability distribution over time for each of a plurality of component variables describing the state of the product or service and state of the conversation, and troubleshooting a product or service by responding based on the probability distribution.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1 illustrates a basic system or computing device embodiment of the invention;

FIG. 2 illustrates a method embodiment of the invention;

DETAILED DESCRIPTION OF THE INVENTION

Figure 3:
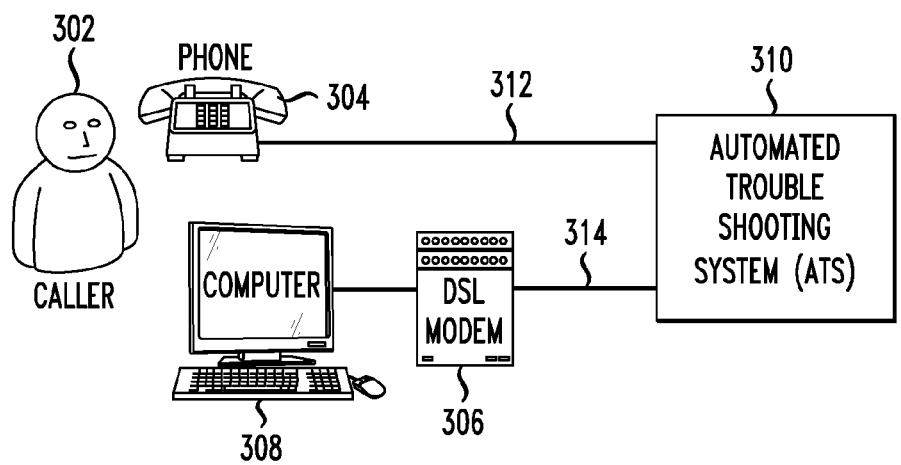
FIG. 3 illustrates a sample DSL troubleshooting system.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

With reference to FIG. 1, an exemplary system for implementing the invention includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS), containing the basic routine that helps to transfer information between elements within the computing device 100, such as during start-up, is typically stored in ROM 140. The computing device 100 further includes storage means such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output means. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative embodiment of the present invention is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

FIG. 2 illustrates a method embodiment for troubleshooting based on a probability distribution model. One sample application of this method is in DSL troubleshooting. Although troubleshooting other devices or software applications may be achieved using the same principles, DSL troubleshooting will be discussed as the primary illustration. First, the method includes establishing a speech-based channel of interaction (202). The speech-based channel of interaction could be a user calling a technical support center on the phone regarding a malfunctioning DSL connection. The speech-based channel of interaction is not necessarily limited to vocalized speech. If, for example, a mute person uses a telephone, a keyboard or other text input apparatus may be used to send plain text, which may be processed by a speech synthesis system, in response to words spoken by another party. Such text input apparatuses are not outside the scope of a speech-based channel of interaction. Similarly, an internet chat session between a user and an automated troubleshooting system could be conducted by text rather than vocalized speech. Such a chat session where neither the user's nor the automated troubleshooting system's text is vocalized is not outside the scope of a speech-based channel of interaction.

Second, the method includes establishing at least one non-speech-based channel of interaction (204). Such non-speech-based channels of interaction may include automated responses from the product or service to troubleshoot or observation of behavior of the product or service to troubleshoot. For example, in DSL troubleshooting, automated responses from the DSL modem may include a response to a ping or successfully opening a remote administration webpage. A "product" can refer to a product, products, a service or services or an offering including product(s) and service(s). Observation of a DSL modem's behavior could include monitoring the number, type, content, and frequency of packets the DSL modem is transmitting on a network. Observation of behavior could also extend to delays or total or partial failures of automated responses. Both speech-based channels of interaction and non-speech-based channels of interaction may be established over a telephone network, a local area network, Internet, or other communications network.

Third, the method relates to maintaining a probability distribution over time for each of a plurality of component variables describing the state of the product or service and state of the conversation (206). A Bayesian network (BN) may be used to maintain the probability distribution. Formally, a Bayesian network is defined as a tuple $3=(S, A, T, C, Z, b0)$ where S is a set of states s describing the environment where s is an element of S; A is a set of actions where a is an element of A which operate on the environment; T defines a transition probability $P(s'|s, a)$; C is a set of observations where o is an element of C which describe the state of the environment; Z defines an observation probability $P(o'|s', a)$; and b0 is an initial belief state, defined below. The Bayesian Network operates as follows: at each time-step, the environment is in some unobserved state s. Since s is not known exactly, a distribution over possible states called a belief state b is maintained where b(s) indicates the probability of being in a particular state s, with b0 denoting the initial belief state. Based on b, a control algorithm (also called a policy) selects an action a, receives a reward r, and the environment transitions to (unobserved) state s', where s' depends only on s and a. The environment then generates an observation o' which is dependent on s' and a. At each time-step, b is updated according to $$b'(s')=\eta \cdot P(o'|s',a)P(s'|s,a)b(s)$$

where η is a normalization constant. The process of maintaining b at each time step is called belief monitoring.

In the Bayesian Network, the plurality of component variables describing the state of the product or service and state of the conversation are collectively represented by s, and which may be decomposed into components $s=(s1, s2, \ldots, sn)$. A control algorithm takes action am, which changes the state of x according to $P(s'|s, am)$. The product then produces an observation y according to $P(y'|s', am)$.

The goal of the general (non-dialog) problem of automated troubleshooting is for a control algorithm to fix a product by taking a sequence of diagnosis and repair actions. Different actions have different reliabilities and different costs, and the aim is to find the sequence that minimizes the total cost. Since the actions are not completely reliable, the true state of the product can't be known with certainty: for example, an instrument may provide a faulty reading.

Fourth, the method provides for troubleshooting a product by responding based on the probability distribution (208). The choice of response can be made using an automatic optimization process, or selected manually. Sample responses based on a probability distribution are illustrated in FIG. 5 and Table 1 in the context of automated troubleshooting of a broken DSL modem. While the illustrative example is a DSL modem, this method may also be used to troubleshoot DSL modems, software applications, televisions, video game consoles, digital video recorders, computers or components of a computer, cellular phones or other communications devices, household appliances, or web pages.

One optimization process that can be used for selecting responses is a partially observable Markov decision processes (POMDPs). A POMDP is a model for control when there is uncertainty in the effects of actions and in the state of the environment. Formally, a POMDP 3 is defined as a tuple= (BN, R, 'y) where BN is a Bayesian Network (described above), R defines the expected (immediate, real-valued) reward $r(s, a)$; and 'y is a geometric discount factor $0<'y<1$. The POMDP operates as follows. At each timestep, the system is in some belief state b, provided by the Bayesian Network. Based on b, a control algorithm (also called a policy) selects an action a, receives a reward r, and the environment transitions to (unobserved) state s', where s' depends only on s and a. The environment then generates an observation o' which is dependent on s' and a. At each time-step, b is updated using the Bayesian Network, described above. The cumulative, infinite-horizon, discounted reward is called the return and written $V=P\infty t=0'y^t r(st,at)$, where st and at indicate the state of the environment and the action taken at time t, respectively. The goal of the control algorithm is to choose actions in such a way as to maximize the expected return E[V] given the POMDP parameters. The process of searching for a control algorithm which maximizes E[v] is called optimization.

Although POMDPs are an elegant model for troubleshooting, they are also notoriously difficult to optimize and much of the troubleshooting literature seeks appropriate constraints which render the optimization tractable, such as assuming that each action affects at most one product state component, that actions have deterministic effects, and that there is only one fault present. More recently, advances in the POMDP literature have radically increased the scalability of optimization algorithms. Viewing troubleshooting as a generic POMDP increases the scope of admissible troubleshooting tasks. This view also allows the uncertainty in the product state to be explicitly modeled in a spoken dialog system.

FIG. 3 illustrates a sample DSL troubleshooting system. A caller 302 with a malfunctioning DSL modem 306 may use a telephone 304 to call an automated troubleshooting system (ATS) 310. The speech-based channel of communication 312 is established between the caller and the ATS via a phone network in this example, but any other suitable system for establishing speech-based communication may suffice. The ATS in this example establishes a non-speech-based channel of communication 314 with the DSL modem over a telephone network and/or the DSL provider's network. In some instances, the ATS may ask the user to interact with the DSL modem by means of a computer 308 or the ATS may ask the user to simply observe the status of the lights on the DSL modem itself. Based on the information obtained from one or more of the available channels of communication, the ATS interacts with the user to gather further information, verify information, issue instructions, etc. which will further the troubleshooting process.

Figure 4:
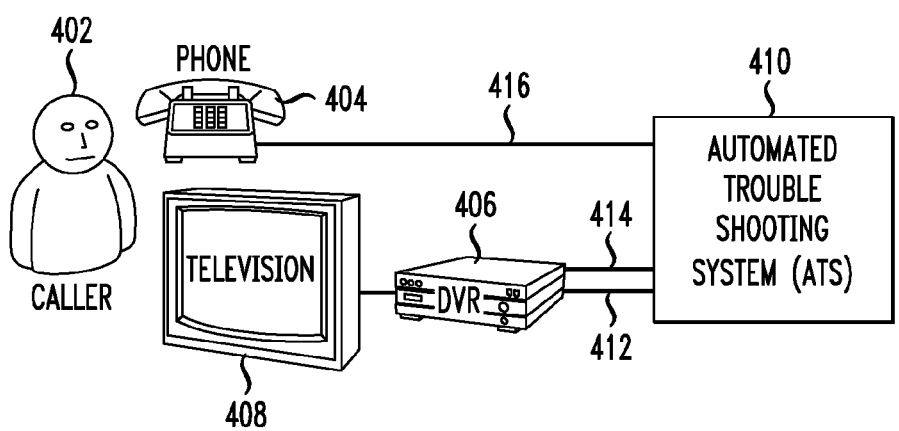
FIG. 4 illustrates a sample digital video recorder troubleshooting system.

FIG. 4 illustrates a sample digital video recorder (DVR) troubleshooting system. A caller 402 with a malfunctioning DVR 406 may use a telephone 404 to call an automated troubleshooting system (ATS) 410. The speech-based channel of communication 416 is established between the caller and the ATS via a phone network in this example, but any other suitable system for establishing speech-based communication may suffice. The ATS in this example establishes two non-speech-based channels of communication 412, 414 with the DVR over a telephone network and a cable television network. A telephone channel of communication could enable automated diagnostics to be performed directly in the DVR and their results returned to the ATS. In some instances, the ATS may ask the user to interact with the DVR by means of a television or other display 408 in conjunction with a remote control or by pressing buttons on the DVR. The ATS may also ask the user to simply observe the status of lights on the DVR or report beeps made by the DVR. Based on the information obtained from one or more of the available channels of communication, the ATS interacts with the user to gather further information, verify information, issue instructions, etc. which will further the troubleshooting process.

Figure 5A:
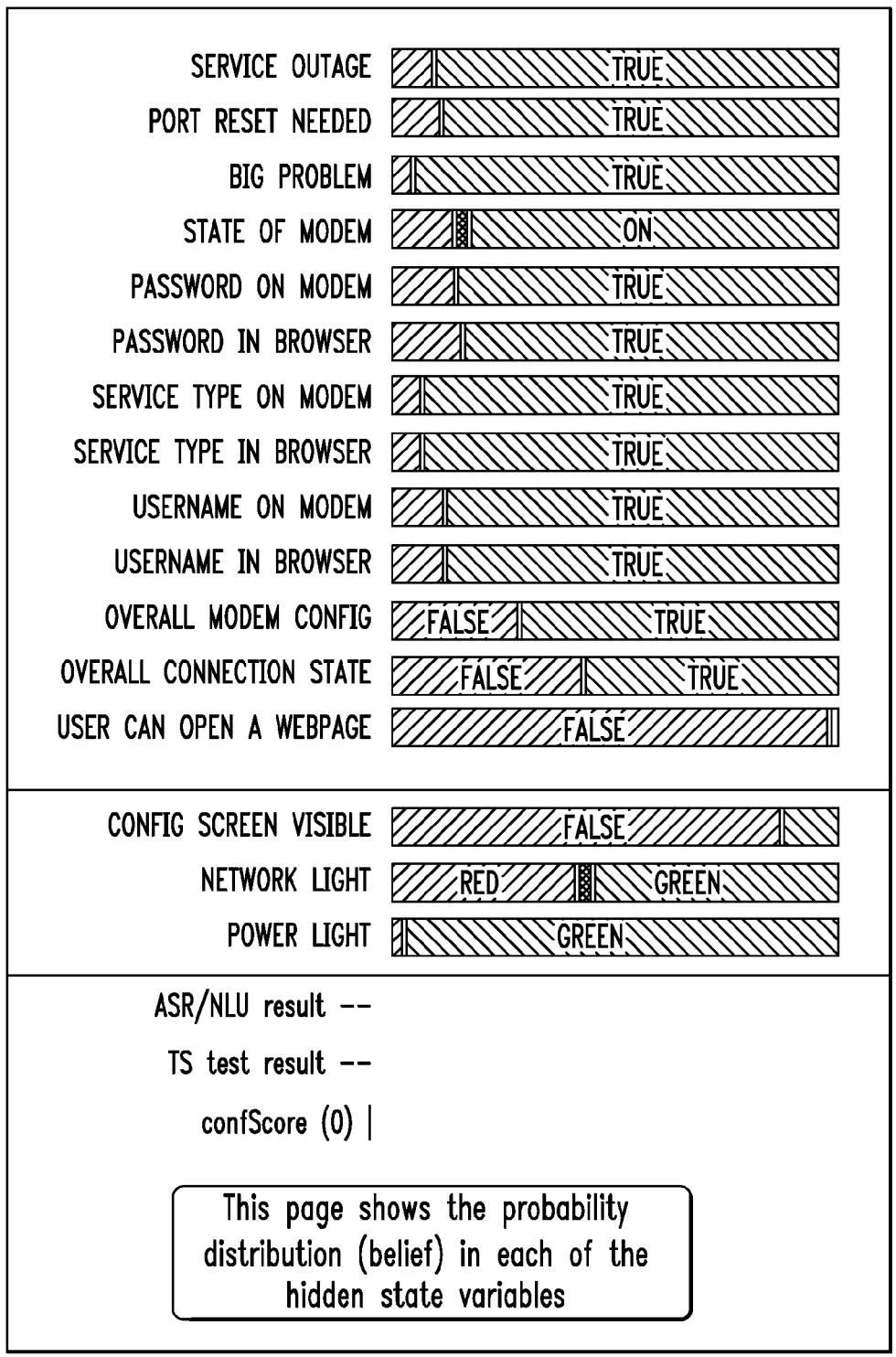
FIGS. 5a-5o, in conjunction with Table 1, illustrate component belief states and what the P(ok) belief state could be at indicated intervals, for a sample conversation between a customer with a broken DSL connection and an automated troubleshooting system.
Figure 5B:
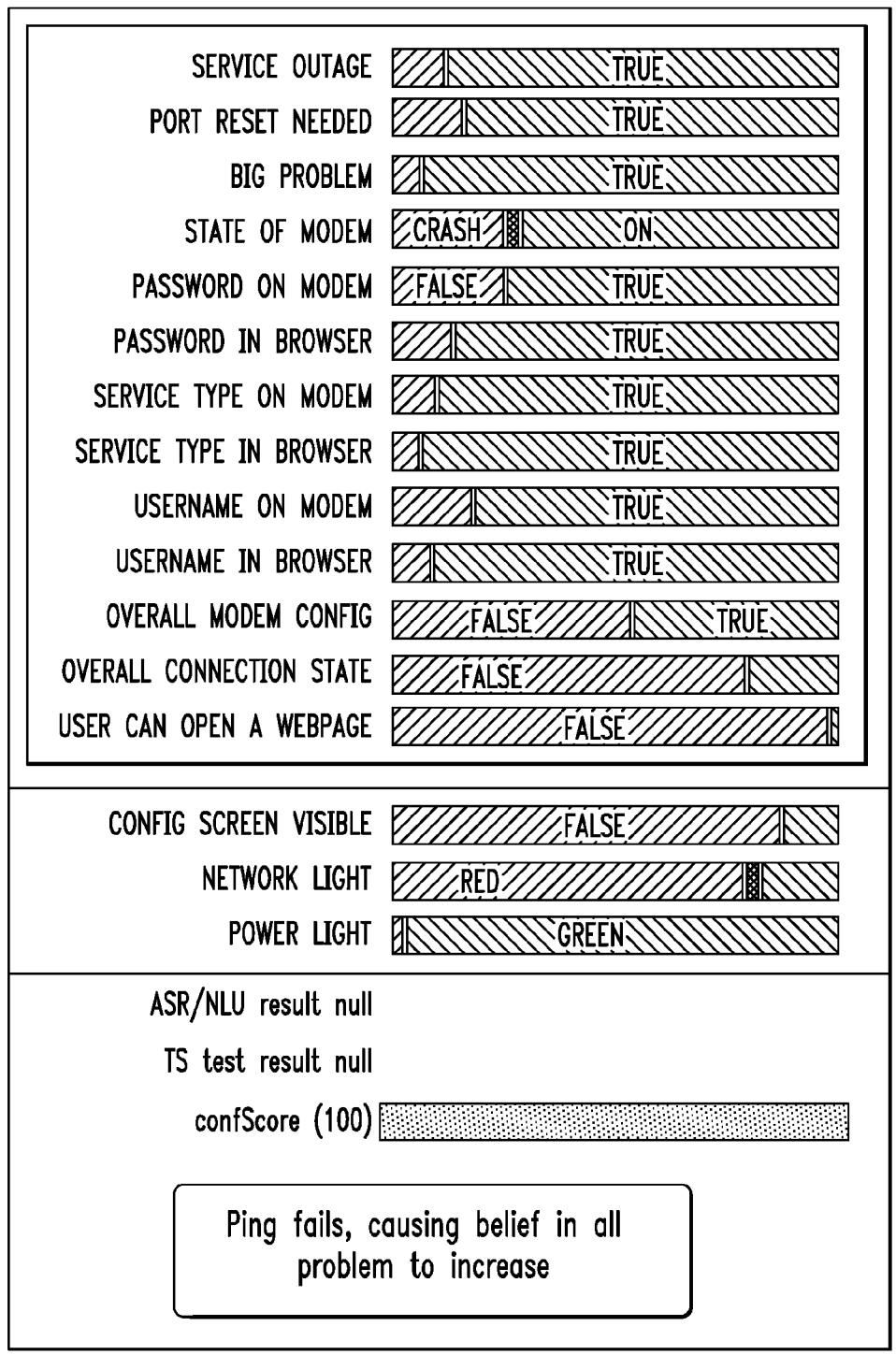
Figure 5C:
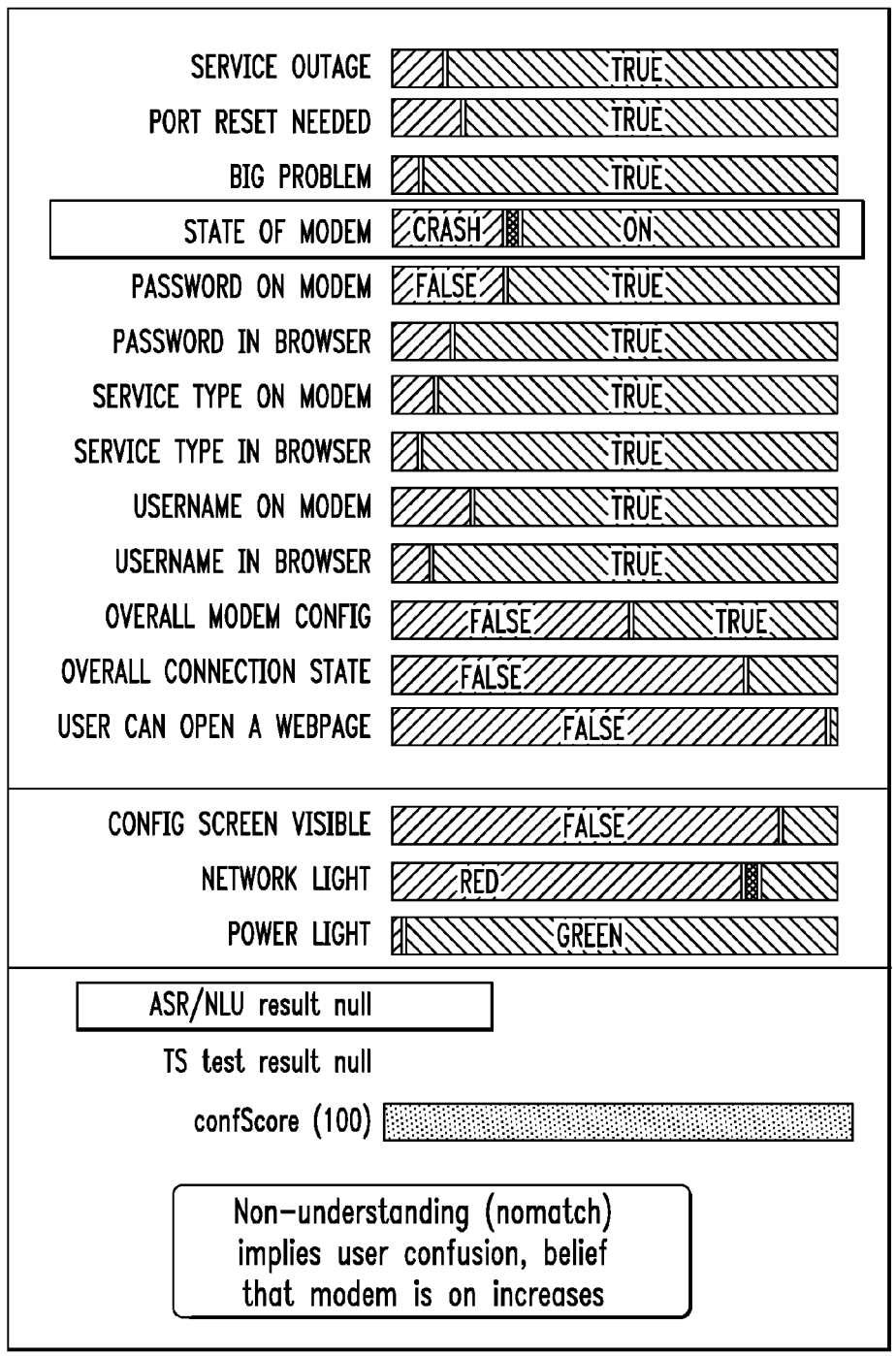
Figure 5J:
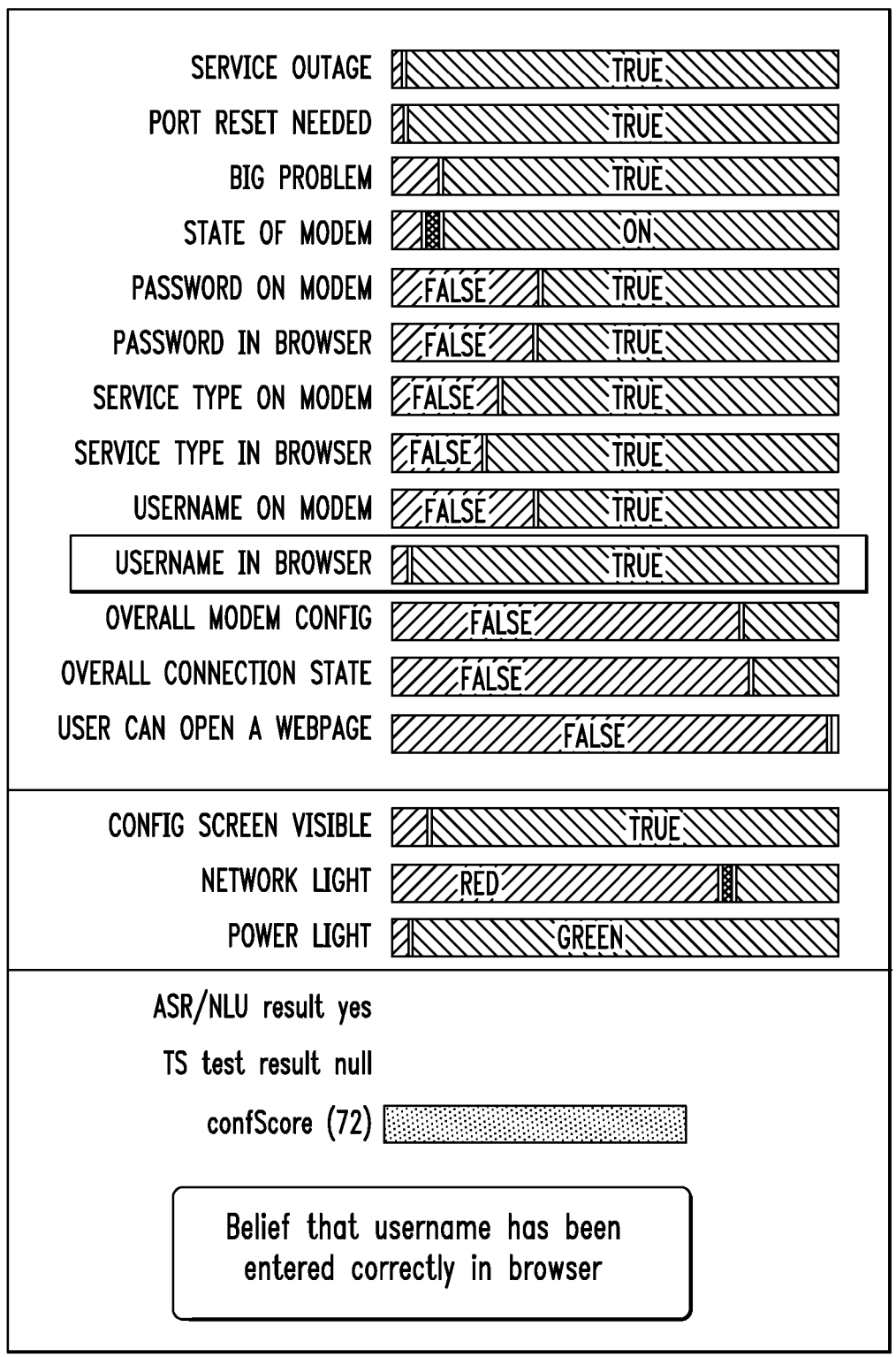
Figure 50:
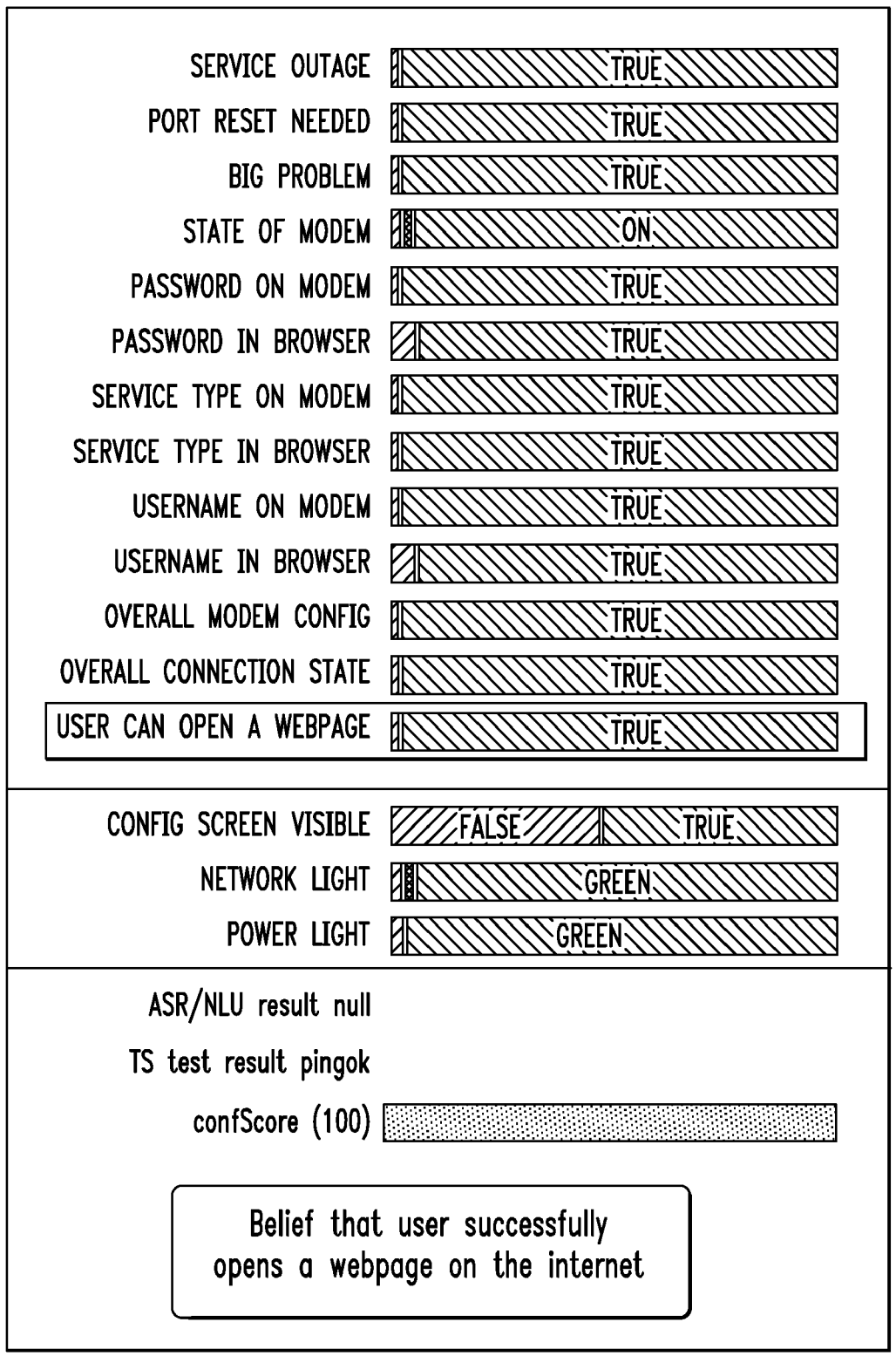

As an illustration of how these principles may be applied in a DSL troubleshooting application, Table 1 provides a sample conversation between a customer with a broken DSL connection and a system implemented as described. The Turn Column indicates which party is speaking the words in the transcript column and which turn the words are spoken on. The Transcript Column is a record of the actual words spoken by each party. The Comments Column describes the system's analysis, reasoning, and/or actions for each turn, if applicable. The P(ok) Column indicates the system's overall belief in whether the connection is working properly. FIGS. 5a-5o are referenced at each interval to show a graphical representation of what the component belief states and what the P(ok) belief state could be at each indicated interval. The P(ok) column overall belief is based on the component belief states in this example. The choice of which ATS to take at each time-step (such as pinging the DSL modem) could be made using a POMDP, through another form of optimization, or designed by hand.

TABLE 1

| Turn | Transcript | Comments | P(ok) |
|------|------------|----------|-------|
| System-01 | Hi, this is DSL support. I'm going to try pinging your modem from here, just a second. | When the conversation starts, the system has a prior expectation that the connection is working of P(ok) = 55%. This system assumes that about half the time, a user error is the cause of the problem rather than a connection problem. | 55% FIG. 5a |
| | Hmmm . . . I can't seem to reach your modem from here Please turn the modem ON | The modem does not respond to the ping, which decreases P(ok) significantly. The system starts troubleshooting. At this point, the system believes the modem is on with P(on) = 65% | 15% FIG. 5b |
| Caller-01 | Um, ok it's on already [NOMATCH~52] | The speech recognizer thinks the user's speech is out of its vocabulary and it returns the "no-match" token. | 20% FIG. 5c |
| System-02 | What color is the network light on your DSL modem? | The dialog system knows that if the modem is already on, the user is likely to be confused, which is in turn likely to produce a "no-match". This increases the probability that the modem is on, to P(on) = 80%. The system now proceeds (correctly) as if the modem were on. | |
| Caller-02 | It's off . . . no, it's red [NO~24] | The user produces dysfluent speech with a self-correction. The recognizer interprets this as "no" with a low confidence. | 20% FIG. 5d |
| System-03 | What color is the network light on your DSL modem? | The previous utterance causes virtually no change in the distribution over all of the problem variables, and so the dialog system essentially disregards the previous utterance and asks the question again. | |
| Caller-03 | It's red [RED~71] | The user says "red" which is recognized correctly with a higher confidence score. | 5% FIG. 5e |
| System-04 | I'm going to check if any outages have been reported, just a moment. | | |
| | Alright, no outages have been reported in your area I'm going to try resetting your connection, just a moment | Finding that there are no outages reported causes an increase in P(ok). | 15% FIG. 5f |
| | Alright, that's done | Resetting the connection causes a further increase in P(ok). | 35% FIG. 5g |
| | What color is the network light on your DSL modem? | | |
| Caller-04 | Red [RED~72] | "Red" recognition result with rather high confidence score causes significant decrease in P(ok) | 5% FIG. 5h |
| System-05 | Please open the DSL modem configuration screen by entering 192.168.0.1 in the address bar. | This portion of the dialog corresponds closely to a scripted troubleshooting procedure. However, if the user shows confusion at any point, the system will break out of this procedure - or example, checking whether the user can see the configuration screen ok. | |
| Caller-05 | Ok [OK~59] | | 15% FIG. 5i |
| System-06 | The username should be J D W. If it's not, go ahead and change it. Is it right, now? | | |
| Caller-06 | Yes [YES~72] | The user is changing settings on the webpage. Since these will not have an effect on the connection until they are "saved" to the DSL modem, this part of the dialog has little effect on P(ok). | 15% FIG. 5j |
| System-07 | The password should be A T T. If it's not, go ahead and fix it. Is it right, now? | | |
| Caller-07 | Yes [YES~74] | | 15% FIG. 5k |
| System-08 | Make the sure the service type is set to PPPoE. Is that correct now? | | |
| Caller-08 | Yes [YES~71] | | FIG. 5l |
| System-09 | Please click on the submit button. | | |
| Caller-09 | Ok [OK~50] | The settings have now been saved to the DSL modem, causing a significant increase in P(ok). | 80% FIG. 5m |
| System-10 | I'm going to try pinging your modem from here, just a second. | | |
| | Ok, I can reach your modem from here | Successful ping confirms that connection is working again, and causes P(ok) to increase dramatically. | 99% FIG. 5n |

TABLE 1-continued

| Turn | Transcript | Comments | P(ok) |
|---|---|---|---|
| | Try browsing to www.att.com. Can you load this page alright? | | |
| Caller-10 | Yes [YES~70] | | 99% FIG. 5o |
| System-11 | Ok, it looks like your connection is working again. Thanks for calling. Goodbye. | At this point the system believes that the user has successfully opened a webpage, and ends the dialog. | |

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, the invention may also be applied to troubleshoot IPTV set-top boxes, network-enabled software, automobiles (such as those using the OnStar® system), all-in-one copier/printer/scanner/fax machines, or even consumer appliances as they become more sophisticated and include non-speech-based connectivity options. Accordingly, the appended claims and their legal equivalents should only define the invention, rather than any specific examples given.

I claim:

1. A method for troubleshooting based on a probability distribution model, the method comprising:
    establishing a speech-based conversation with a user;
    establishing at least one non-speech-based channel of interaction for obtaining behavioral information associated with a product during the speech-based conversation;
    for each of a plurality of component variables, maintaining via a processor a probability distribution for a state of the product based on a state of the speech-based conversation over time and a state of the behavioral information over time; and
    troubleshooting the product by responding based on the probability distribution.

2. The method of claim 1, wherein the at least one non-speech-based channel of interaction includes automated responses from the product to troubleshoot.

3. The method of claim 1, wherein the at least one non-speech-based channel of interaction includes observing behavior of the product to troubleshoot.

4. The method of claim 1, wherein the at least one of speech-based conversation and the at least one non-speech-based channel of interaction are established over at least one of a telephone network, a local area network, Internet, and other communications network.

5. The method of claim 1, wherein Bayesian Networks are used to maintain the probability distribution.

6. The method of claim 1, wherein partially observable Markov decision processes (POMDPs) are used to select troubleshooting responses.

7. The method of claim 1, wherein troubleshooting is performed on at least one of a DSL modem, software applications, television, video game console, digital video recorder, computer or components of a computer, cellular phone or other communications device, household appliances, and web page.

8. A system for troubleshooting based on a probability distribution model, the system comprising:
    a processor;
    a first module configured to control the processor to establish a speech-based conversation with the user;
    a second module configured to control the processor to establish at least one non-speech-based channel of interaction for obtaining behavioral information associated with the product during the speech-based conversation;
    a third module configured to control the processor to maintain a probability distribution over time for each of a plurality of component variables describing a state of the product based on a state of a conversation over time and a state of the behavioral information over time; and a fourth module configured to control the processor to troubleshoot the product by responding based on the probability distribution.

9. The system of claim 8, wherein the at least one non-speech-based channel of interaction includes automated responses from the product to troubleshoot.

10. The system of claim 8, wherein the at least one non-speech-based channel of interaction includes observing behavior of the product to troubleshoot.

11. The system of claim 8, wherein at least one of the speech-based conversation and the at least one non-speech-based channel of interaction are established over one of a telephone network, a local area network, Internet, and other communications network.

12. The system of claim 8, wherein Bayesian Networks are used to maintain the probability distribution.

13. The system of claim 8, wherein partially observable Markov decision processes (POMDPs) are used to select troubleshooting responses.

14. The system of claim 8, wherein troubleshooting is performed on at least one of a DSL modem, software applications, television, video game console, digital video recorder, computer or components of a computer, cellular phone or other communications device, household appliances, and web page.

15. A non-transitory computer-readable medium storing a computer program having instructions for troubleshooting based on a probability distribution model, the instructions comprising:

establishing a speech-based conversation with a user;

establishing at least one non-speech-based channel of interaction for obtaining behavioral information associated with the product or service during the sub-based conversation;

for each of a plurality of component variables describing the current state of the product, maintaining a probability distribution over time based on a state of the sub-based conversation over time and a state of the behavioral information over time; and troubleshooting product by responding based on the probability distribution.

16. The non-transitory computer-readable medium of claim 15, wherein the at least one non-speech-based channel of interaction includes automated responses from the product to troubleshoot.

17. The non-transitory computer-readable medium of claim 15, wherein the at least one non-speech-based channel of interaction includes observing behavior of the product to troubleshoot.

18. The non-transitory computer-readable medium of claim 15, wherein at least one of the speech-based conversation and the at least one non-speech-based channel of interaction are established over one of a telephone network, a local area network, Internet, and other communications network.

19. The non-transitory computer-readable medium of claim 15, wherein Bayesian Networks are used to maintain the probability distribution.

20. The non-transitory computer-readable medium of claim 15, wherein partially observable Markov decision processes (POMDPs) are used to select troubleshooting actions.

21. The non-transitory computer-readable medium of claim 15, wherein troubleshooting is performed on at least one of a DSL modem, software applications, television, video game console, digital video recorder, computer or components of a computer, cellular phone or other communications device, household appliances, and web page.

* * * * *